United States Patent
Lee

(10) Patent No.: US 9,332,477 B2
(45) Date of Patent: May 3, 2016

(54) LOCATION DRIVEN ASSOCIATION OF CLIENT DEVICES TO ACCESS POINTS

(71) Applicant: Aruba Networks, Inc., Sunnyvale, CA (US)

(72) Inventor: Jiwoong Lee, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/445,674

(22) Filed: Jul. 29, 2014

(65) Prior Publication Data

US 2016/0037427 A1 Feb. 4, 2016

(51) Int. Cl.
*H04W 36/00* (2009.01)
*H04W 36/32* (2009.01)
*H04W 36/08* (2009.01)
*H04W 36/36* (2009.01)

(52) U.S. Cl.
CPC .............. *H04W 36/32* (2013.01); *H04W 36/08* (2013.01); *H04W 36/36* (2013.01)

(58) Field of Classification Search
CPC ...... H04W 36/32; H04W 36/08; H04W 36/36
USPC .......................................... 455/436; 370/310
See application file for complete search history.

(56) References Cited

U.S. PATENT DOCUMENTS

| | | | | |
|---|---|---|---|---|
| 6,061,337 A | * | 5/2000 | Light | H04W 36/32 370/331 |
| 2007/0258393 A1 | * | 11/2007 | Cam-Winget | G01S 5/02 370/310 |
| 2014/0323130 A1 | * | 10/2014 | Kowshik | H04W 36/245 455/436 |
| 2015/0038143 A1 | * | 2/2015 | Kilpatrick, II | H04W 76/06 455/436 |

* cited by examiner

*Primary Examiner* — Nathan Taylor
(74) *Attorney, Agent, or Firm* — Hewlett Packard Enterprise Patent Department

(57) ABSTRACT

A method may determine the location and/or motion of a client device. Based on these determinations, the method may 1) delay a potential move of the client device to a new access point until the client device reaches a non-transitional or less dense area or is stationary, 2) delay a potential move of the client device to a new access point while the client device is on the edge of the network environment, 3) compute a probable destination of the client device and wait until this destination is reached before triggering movement to a new access point, 4) reduce the effects caused by shadowing, 5) guide the client device to more proximate access points, and 6) guide the client device to dedicated proximate access points when client devices are relatively motionless. Accordingly, the method dynamically leverages client device location and motion to intelligently assign client devices to access points.

17 Claims, 11 Drawing Sheets

US 9,332,477 B2

LOCATION DRIVEN ASSOCIATION OF CLIENT DEVICES TO ACCESS POINTS

TECHNICAL FIELD

The present disclosure relates to using location information of a client device and/or a set of access points in a network system to dynamically determine a proper access point for a client device to associate with.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

For example, multiple access points may jointly serve a common area. Accordingly, a client device operating in this area may be able to associate with one from a set of two or more of the access points such that the access points may provide network access to the client device. Although the client device may have many options with respect to access points association, to ensure efficient communications, the network system must determine an optimal access point for the client device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
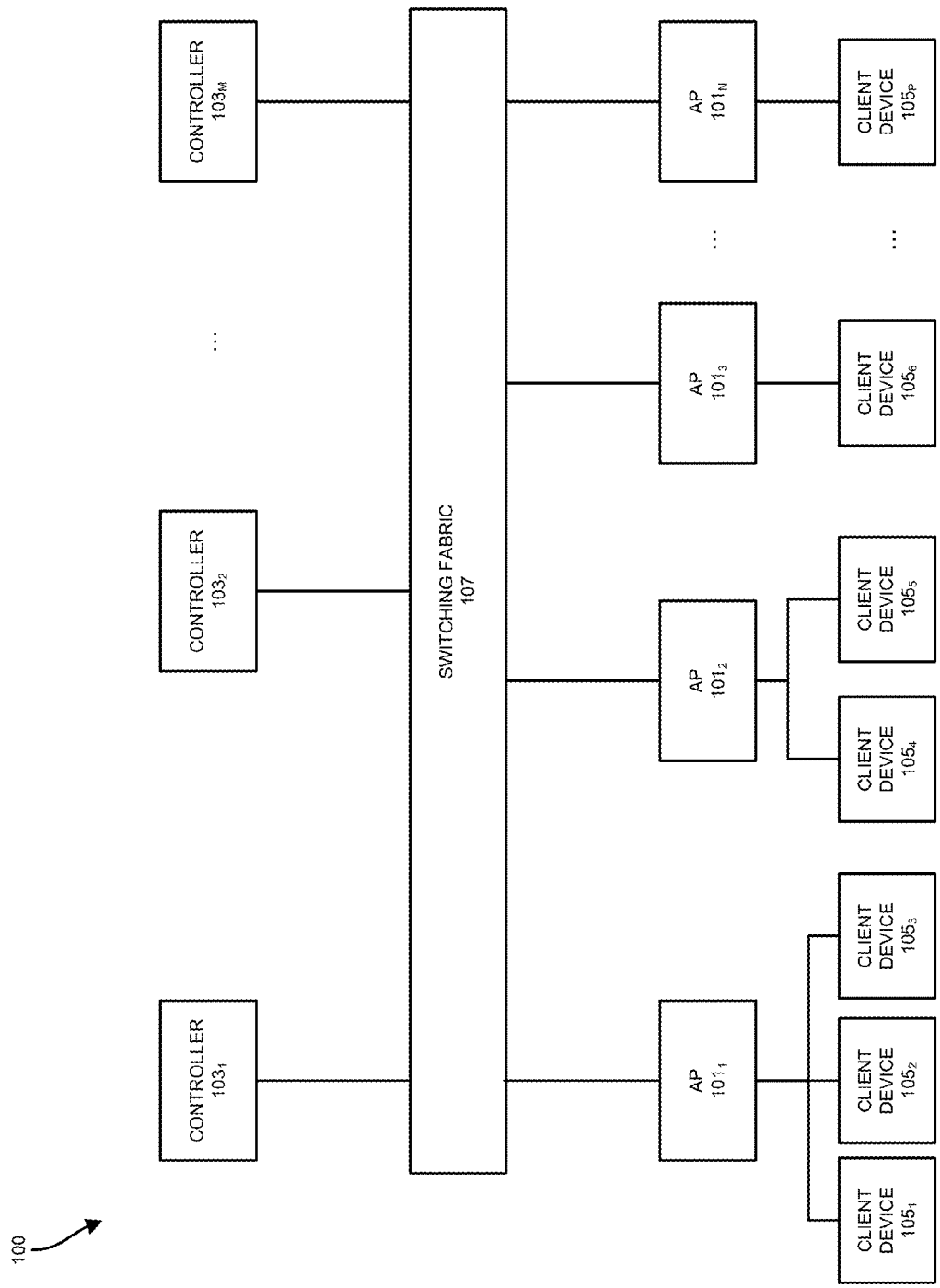
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of a network system 100 in accordance with one or more embodiments. The network system 100, as illustrated in FIG. 1, is a digital system that may include a plurality of digital devices such as one or more access points $101_1$-$101_N$, one or more network controllers $103_1$-$103_M$, and one or more client devices $105_1$-$105_P$. The access points $101_1$-$101_N$ and the network controllers $103_1$-$103_M$ may be connected through the switching fabric 107 via wired and/or wireless connections. The client devices $105_1$-$105_P$ may be connected or otherwise associated with the access points $101_1$-$101_N$ through corresponding wireless connections.

The network system 100 may be installed/distributed in any region or area. For example, the access points $101_1$-$101_N$ may be installed in an office building or another similar structure. The location the network system 100 is installed/distributed in defines a network environment. The network environment may be described by various characteristics, including size, location (e.g., country, state, county, city, etc.), and radio frequency (RF) characteristics of the area (e.g., RF interference). The client devices $105_1$-$105_P$ may be mobile devices that may move through and out of the network environment in which the network system 100 is installed. Accordingly, as the client devices $105_1$-$105_P$ move through the network environment, each of the client devices $105_1$-$105_P$ may move between access points $101_1$-$101_N$ to ensure uninterrupted network access. Processes and techniques for dynamically and intelligently determining a proper access point $101_1$-$101_N$ for a client device $105_1$-$105_P$ to associate with will be described in greater detail below.

Each element of the network system 100 will be described below by way of example. In one or more embodiments, the network system 100 may include more or less devices than the devices illustrated in FIG. 1, which may be connected to other devices within the network system 100 via wired and/or wireless mediums. For example, in other embodiments, the network system 100 may include other network devices than those shown in FIG. 1.

Figure 2:
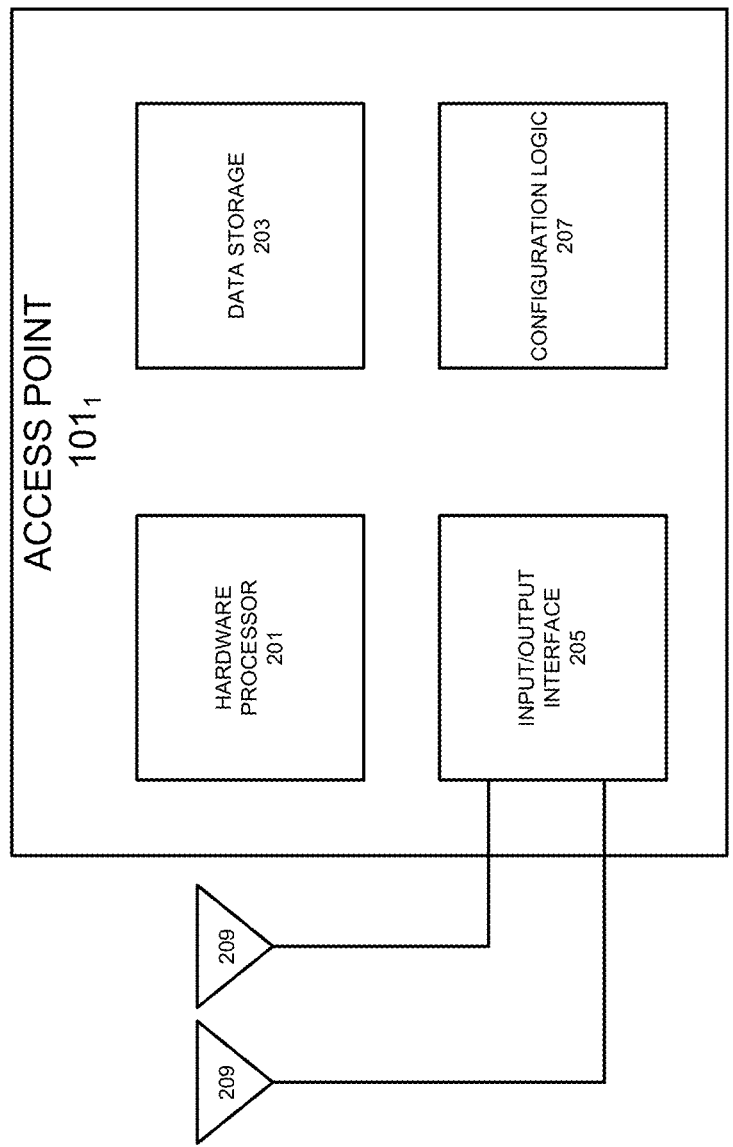
FIG. 2 shows a block diagram example of an access point in accordance with one or more embodiments.

The access points $101_1$-$101_N$ may be any device that can associate with the client devices $105_1$-$105_P$ to transmit and receive data over wireless channels. Each of the access points $101_1$-$101_N$ may operate on various wireless channels (i.e., frequency segments). In one embodiment, the access points $101_1$-$101_N$ may correspond to a network device such as a wireless access point, a switch, a router, or any combination thereof. FIG. 2 shows a component diagram of the access point $101_1$ according to one embodiment. In other embodiments, the access points $101_2$-$101_N$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during performance of operations/tasks and a hierarchy of persistent memory, such as Read Only Memory (ROM), Erasable Programmable Read Only Memory (EPROM) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the data storage 203 of the access point $101_1$ may store data to be forwarded to the client devices $105_1$-$105_P$ or to one or more of the network controllers $103_1$-$103_M$.

In one embodiment, the I/O interface 205 corresponds to one or more components used for communicating with other devices (e.g., the client devices $105_1$-$105_P$, the network controllers $103_1$-$103_M$, and/or other access points $101_2$-$101_N$) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client devices $105_1$-$105_P$ and the network controllers $103_1$-$103_M$ over corresponding wireless channels in the system 100. In one embodiment, the I/O interface 205 facilitates communications between the access point $101_1$ and one or more of the network controllers $103_1$-$103_M$ through the switching fabric 107. In one embodiment, the switching fabric 107 includes a set of network components that facilitate communications between multiple devices. For example, the switching fabric 107 may be composed of one or more switches, routers, hubs, etc. These network components that comprise the switching fabric 107 may operate using both wired and wireless mediums.

In some embodiments, the I/O interface 205 may include one or more antennas 209 for communicating with the client devices $105_1$-$105_P$, the network controllers $103_1$-$103_M$, and/or other wireless devices in the network system 100. For example, multiple antennas 209 may be used for forming transmission beams to one or more of the client devices $105_1$-$105_P$ or the network controllers $103_1$-$103_M$ through adjustment of gain and phase values for corresponding antenna 209 transmissions. The generated beams may avoid objects and create an unobstructed path to the client devices $105_1$-$105_P$ and/or the network controllers $103_1$-$103_M$.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to allow the access point $101_1$ to associate with different client devices $105_1$-$105_P$.

As described above, the other access points $101_2$-$101_N$ may be similarly configured as described above in relation to access point $101_1$. For example, the access points $101_2$-$101_N$ may each comprise a hardware processor 201, data storage 203, an input/output (I/O) interface 205, and device configuration logic 207 in a similar fashion as described above in relation to the access point $101_1$.

In one embodiment, the client devices $105_1$-$105_P$ may be any wireless or wired electronic devices capable of receiving and transmitting data over wired and wireless mediums. For example, the client devices $105_1$-$105_P$ may be one or more of personal computers, laptop computers, netbook computers, wireless music players, portable telephone communication devices, smart phones, tablets, and digital televisions. In one embodiment, the client devices $105_1$-$105_P$ are digital devices that include a hardware processor, memory hierarchy, and input/output (I/O) interfaces including a wired and/or wireless interface such as an IEEE 802.3 interface. In one embodiment, the configuration of the components within the client devices $105_1$-$105_P$ may be similar to those discussed above in relation to the access point $101_1$. In other embodiments, the client devices $105_1$-$105_P$ may include more or less components than those shown in FIG. 2 in relation to the access point $101_1$.

As noted above, the client devices $105_1$-$105_P$ may be mobile devices that are free to move through a network environment in which the network system 100 is installed. For example, the client device $105_1$ may be a mobile phone. In this example, the user of the client device $105_1$ may move from one side of the network environment to another side of the network environment. During this movement, the client device $105_1$ may be serviced by various access points $101_1$-$101_N$ that provide network access to the client device $105_1$. Processes and techniques for dynamically and intelligently determining a proper access point $101_1$-$101_N$ for the client device $105_1$ to associate with as the client device $105_1$ moves through the network environment will be described in greater detail below.

In one embodiment, the network controllers $103_1$-$103_M$ are digital devices that include a hardware processor, memory hierarchy, and input/output (I/O) interfaces including a wired and/or wireless interface such as an IEEE 802.3 interface. In one embodiment, the configuration of the components within the network controllers $103_1$-$103_M$ may be similar to those discussed above in relation to the access point $101_1$. In other embodiments, the network controllers $103_1$-$103_M$ may include more or less components than those shown in FIG. 2 in relation to the access point $101_1$.

In one embodiment, the network controllers $103_1$-$103_M$ may be any set of devices that assist the access points $101_1$-$101_N$ in performing network tasks and operations. For example, the network controllers $103_1$-$103_M$ may assist in determining a proper access point $101_1$-$101_N$ for a client device $105_1$-$105_P$ to associate. In some embodiments, the decision of which access point $101_1$-$101_N$ a client device $105_1$-$105_P$ should associate with is based on various factors, including the location of one or more of the client devices $105_1$-$105_P$, the location/layout of the access points $101_1$-$101_N$, and load characteristics of the access points $101_1$-$101_N$. The different processes and techniques for dynamically and intelligently determining a proper access point $101_1$-$101_N$ for a client device $105_1$-$105_P$ to associate with will be described in greater detail below.

Figure 3:
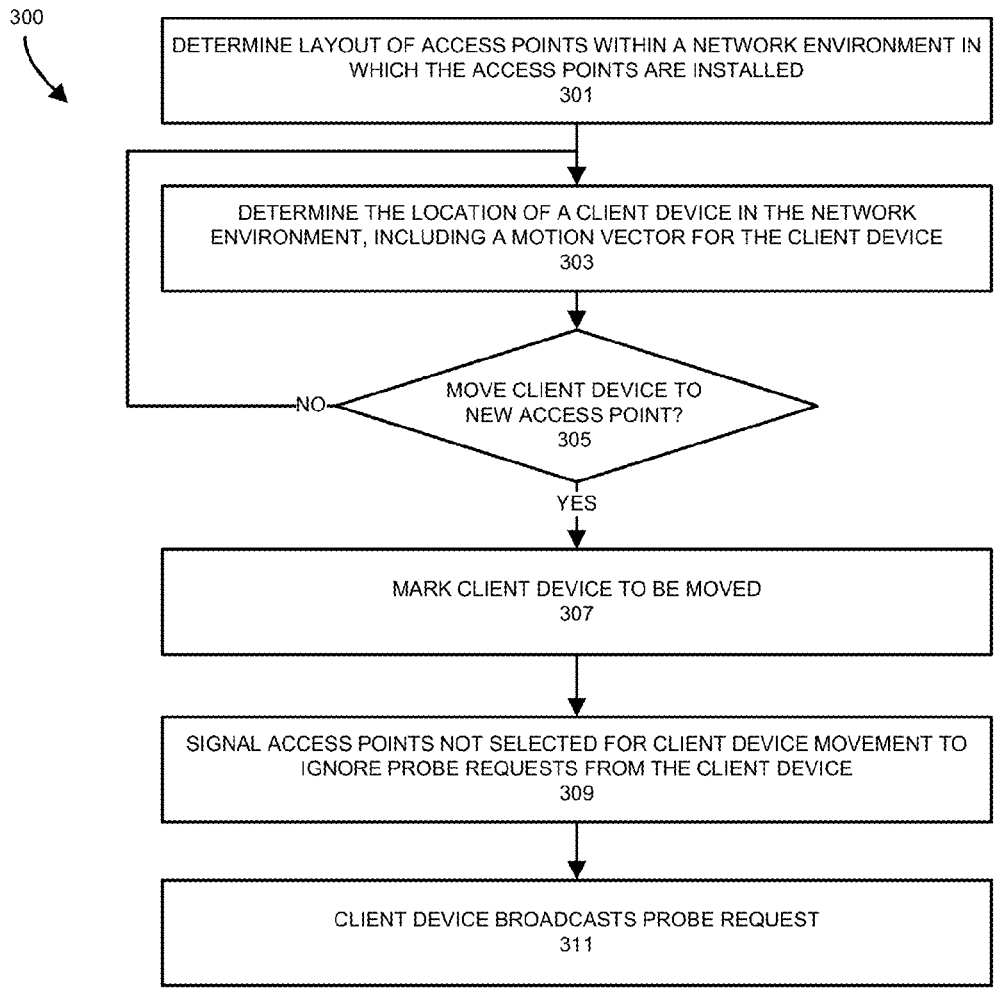
FIG. 3 shows a method for dynamically and intelligently determining a proper/optimal access point for a client device to associate with according to one embodiment.

Location Based Matching of Client Devices $105_1$-$105_P$ and Access Points $101_1$-$101_N$ FIG. 3 shows a method 300 for dynamically and intelligently determining a proper/optimal access point $101_1$-$101_N$ for a client device $105_1$-$105_P$ to associate with according to one embodiment. The method 300 may be performed by one or more devices in the network system 100. For example, the method 300 may be performed by one or more of the network controllers $103_1$-$103_M$ in conjunction with one or more of the access points $101_1$-$101_N$. In one embodiment, one of the network controllers $103_1$-$103_M$ may be designated as a master network controller in the network system 100 such that each operation of the method 300 is performed by this designated master network controller. In another embodiment, the method 300 may be entirely performed by one or more access points $101_1$-$101_N$.

Although each of the operations in the method 300 are shown and described in a particular order, in other embodiments, the operations of the method 300 may be performed in a different order. For example, although the operations of the method 300 are shown as being performed sequentially, in other embodiments the operations of the method 300 may be performed concurrently or during partially overlapping time periods.

Figure 4:
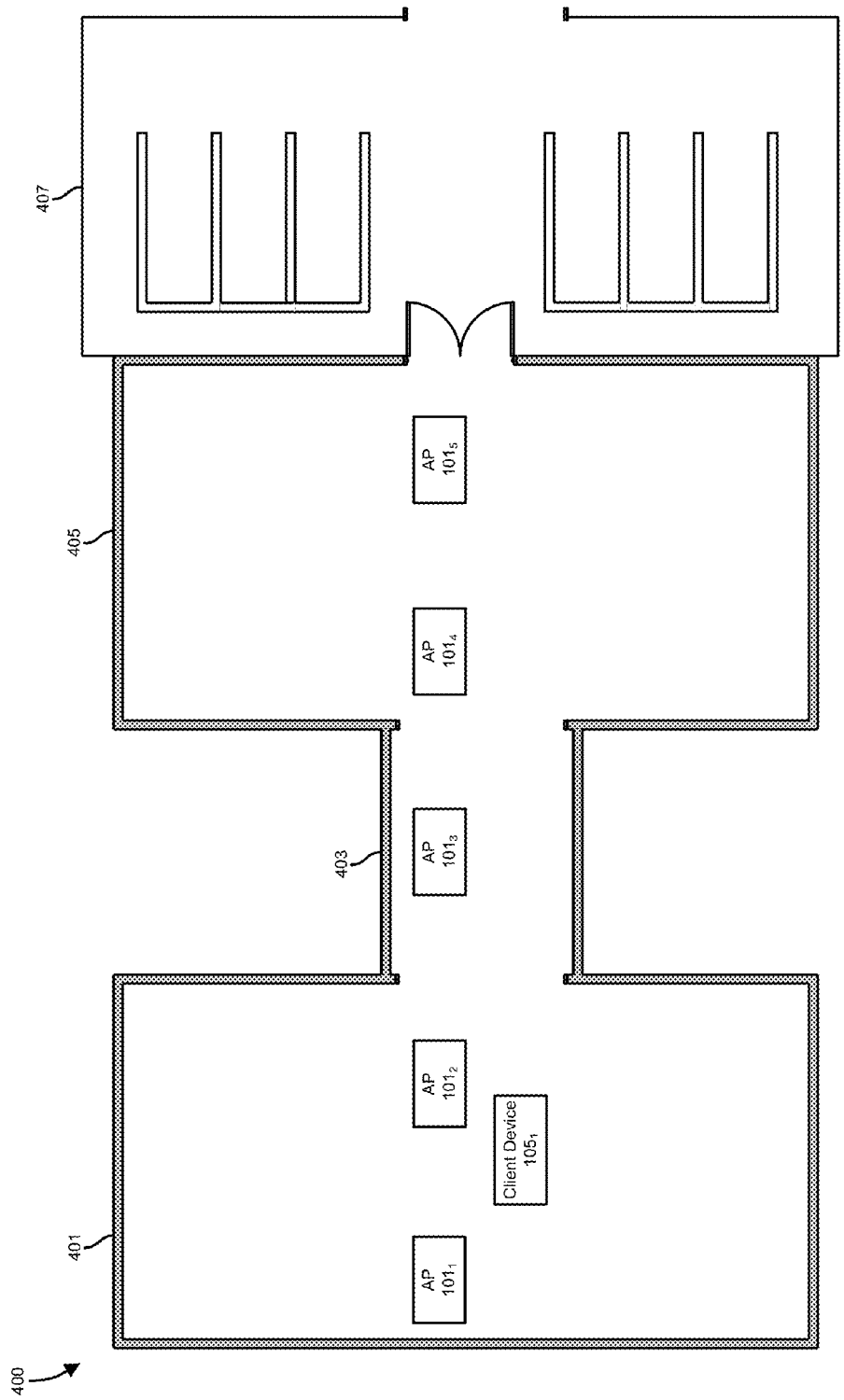
FIG. 4 shows an example set of access points installed in an office building according to one embodiment.

In one embodiment, the method 300 may commence at operation 301 with the determination of the layout of the access points $101_1$-$101_N$ in the network environment in which the network system 100 is installed. For example, the network system 100, including the access points $101_1$-$101_N$, may be installed in an office building or another structure. FIG. 4 shows an example set of access points $101_1$-$101_5$ installed in an office building 400. In this example, a single client device $105_1$ may be active and moving around within the building 400. Although only one client device $105_1$ is provided, in other embodiments, multiple client devices $105_1$-$105_P$ may be active and moving throughout the building 400.

As shown, the access points $101_1$-$101_5$ are installed in a main office 401, a hallway 403, and a lobby 405 of the office building 400. The wireless network access provided by the installed access points $101_1$-$101_5$ may extend past the bounds of the office building 400 and/or the individual areas within the office building 400 in which the access points $101_1$-$101_5$ are installed. For example, the wireless reach of the access points $101_1$ and/or $101_2$ installed in the main office 401 may extend into the hallway 403, the wireless reach of the access point $101_3$ installed in the hallway 403 may extend into both the main office 401 and/or the lobby 405, and the wireless reach of the access points $101_4$ and/or $101_5$ installed in the lobby 405 may extend into the hallway 403 and/or the parking lot 407. Accordingly, at any given location within the building 400, the client device $105_1$ may be capable of associating with multiple access points $101_1$-$101_5$ installed in various areas of the building 400.

In one embodiment, operation 301 may determine the layout of the access points $101_1$-$101_N$ in the network environment based on signal strength values from wireless signals transmitted and detected by the access points $101_1$-$101_N$. For example, the access points $101_1$-$101_N$ may each emit a set of wireless signals in the network environment. These wireless signals may be for the purpose of transmitting data between the corresponding access points $101_1$-$101_N$ and another device and unrelated to the determination of access point $101_1$-$101_N$ layout (e.g., application data and/or control signals transmitted over an established connection between an access point $101_1$-$101_N$ and another wireless device) or the wireless signals may be emitted for the purpose of determining access point $101_1$-$101_N$ layout. Upon detection of these wireless signals, an access point $101_1$-$101_N$ may determine a power level of the received signal. Together with a known transmission power of the wireless signals, the signal strength values may be used to determine the distance separating the access points $101_1$-$101_N$ and direction of each access point $101_1$-$101_N$ relative to each other in the network environment. In one embodiment, the signal strength indicators corresponding to these wireless signals may be received signal strength indicator (RSSI) values.

In another embodiment, the layout of the access points $101_1$-$101_N$ may be determined based on a pre-populated access point $101_1$-$101_N$ configuration table or another data structure, which describes the physical layout of the access points $101_1$-$101_N$ in the network environment. For example, a system administrator may populate a table with a set of distance values and angle measurements describing the arrangement of the access points $101_1$-$101_N$ in the network environment. This access point $101_1$-$101_N$ layout table may have been populated during installation of the access points $101_1$-

$101_N$ in the network environment and updated periodically as access points $101_1$-$101_N$ were moved, removed, or added to the network environment.

In one embodiment, layout information determined at operation 301 may also be used to determine edge access points $101_1$-$101_N$. Edge access points $101_1$-$101_N$ are access points $101_1$-$101_N$ that lie on the outside boundaries of the network environment. For example, in FIG. 4 the access point $101_5$ may be considered an edge access point $101_1$-$101_N$ based on the location of the access point $101_5$ on the periphery of the network environment.

At operation 303, the location of one or more of the client devices $105_1$-$105_P$ may be determined. Similar to the location of the access points $101_1$-$101_N$, the location of the client devices $105_1$-$105_P$ may be determined based on signal strength readings between the client devices $105_1$-$105_P$ and a set of access points $101_1$-$101_N$. For example, one or more of the access points $101_1$-$101_5$ shown in FIG. 4 may record wireless signal strength values for wireless signals emitted by the client device $105_1$. Alternatively, the client device $105_1$ may record signal strength values from one or more access points $101_1$-$101_5$ and record these values. These signal strength values may be used to determine the location of the client device $105_1$ within the building 400 and/or relative to the building 400. For example, the location information may include multi-dimensional coordinates (e.g., x, y, and z coordinate values) relative to a landmark within the building (e.g., an installed access point $101_1$-$101_5$).

Figure 5:
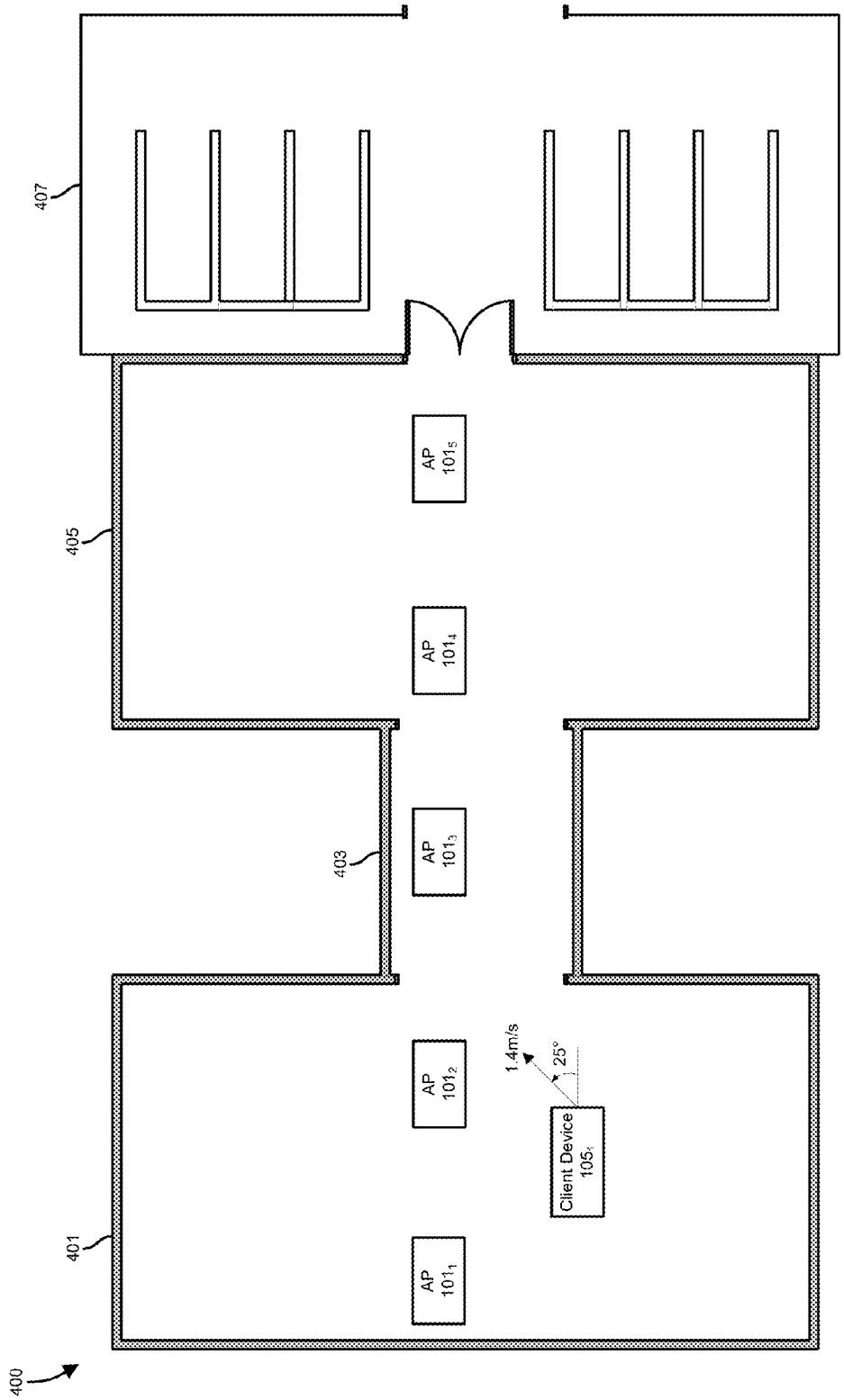
FIG. 5 shows the motion of a client device according to one embodiment.

In addition to the actual location of the client devices $105_1$-$105_P$, in some embodiments a motion vector for the client devices $105_1$-$105_P$ may be determined at operation 303. A motion vector describes the physical movement/motion of a corresponding client device $105_1$-$105_P$ in the network environment. For example, the motion vector may include a speed/velocity and/or direction of movement values. For instance, based on several signal strength readings taken from multiple access points $101_1$-$101_5$ over time, operation 303 may determine that the client device $105_1$ is moving at approximately 1.4 meters/second (i.e., 5.0 kilometers/hour; 3.1 miles/hour) and at an angle of 25 degrees relative to an axis as shown in FIG. 5.

Although described in relation to signal strength values, in other embodiments the location of client devices $105_1$-$105_P$, including a motion vector, may be determined based on any location determination technique. For example, in some embodiments satellite positioning systems (e.g., Global Positioning System (GPS)) may be used at operation 303 to assist in determining the location of the client devices $105_1$-$105_P$.

Following the determination of the current location of one or more of the client devices $105_1$-$105_P$, including optionally a motion vector, operation 305 may determine whether one or more of the client devices $105_1$-$105_P$ should be moved from a currently associated access point $101_1$-$101_N$ to a new access point $101_1$-$101_N$. This determination may be made based on various factors and considerations, including the location of one or more of the client devices $105_1$-$105_P$, the location/layout of the access points $101_1$-$101_N$, time of day/week, and/or load characteristics of the access points $101_1$-$101_N$, as will be described by way of example below.

Leaving Client Device $105_1$-$105_P$

Figure 6A:
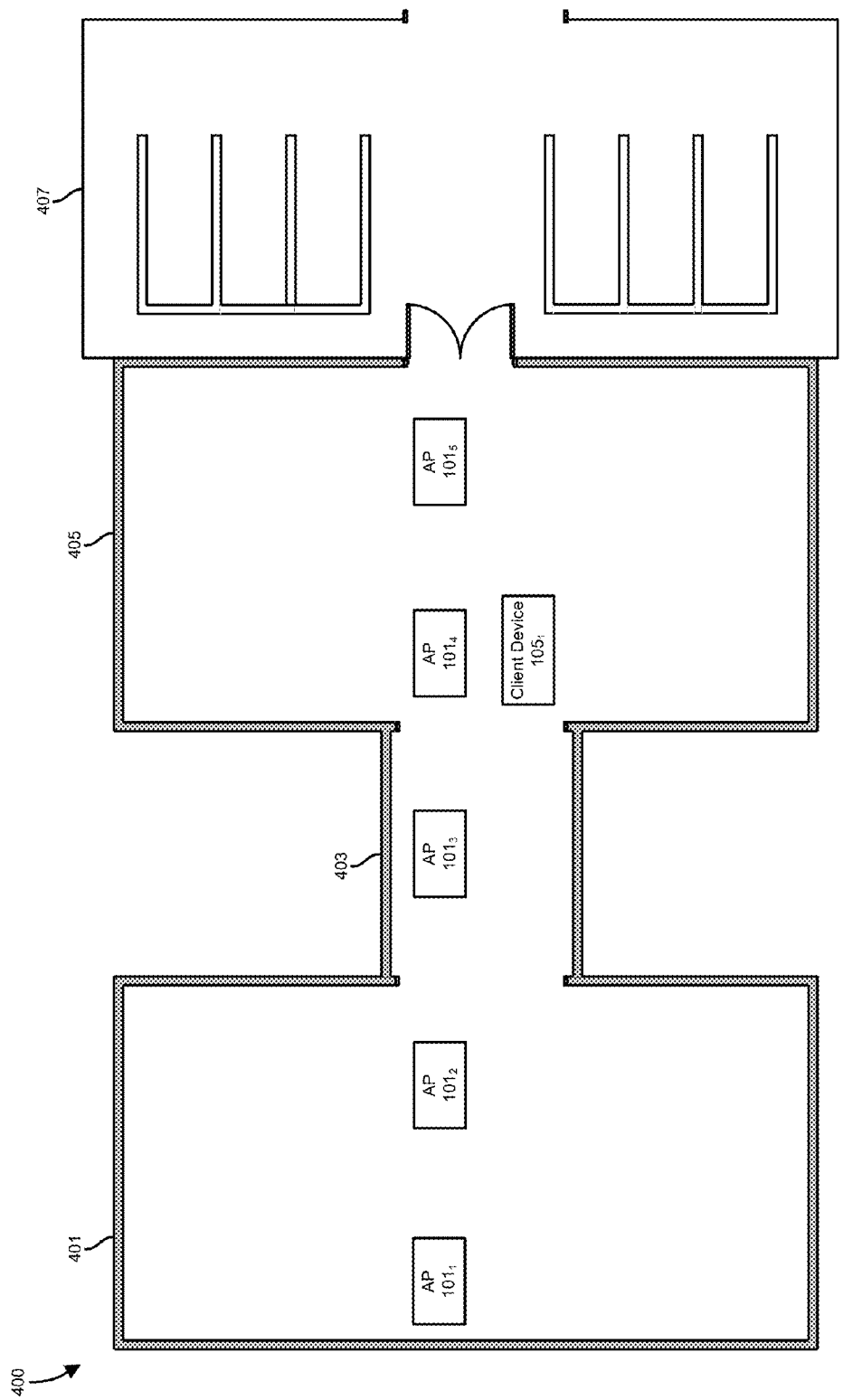
FIG. 6A shows a client device in a lobby of a building according to one embodiment.
Figure 6B:
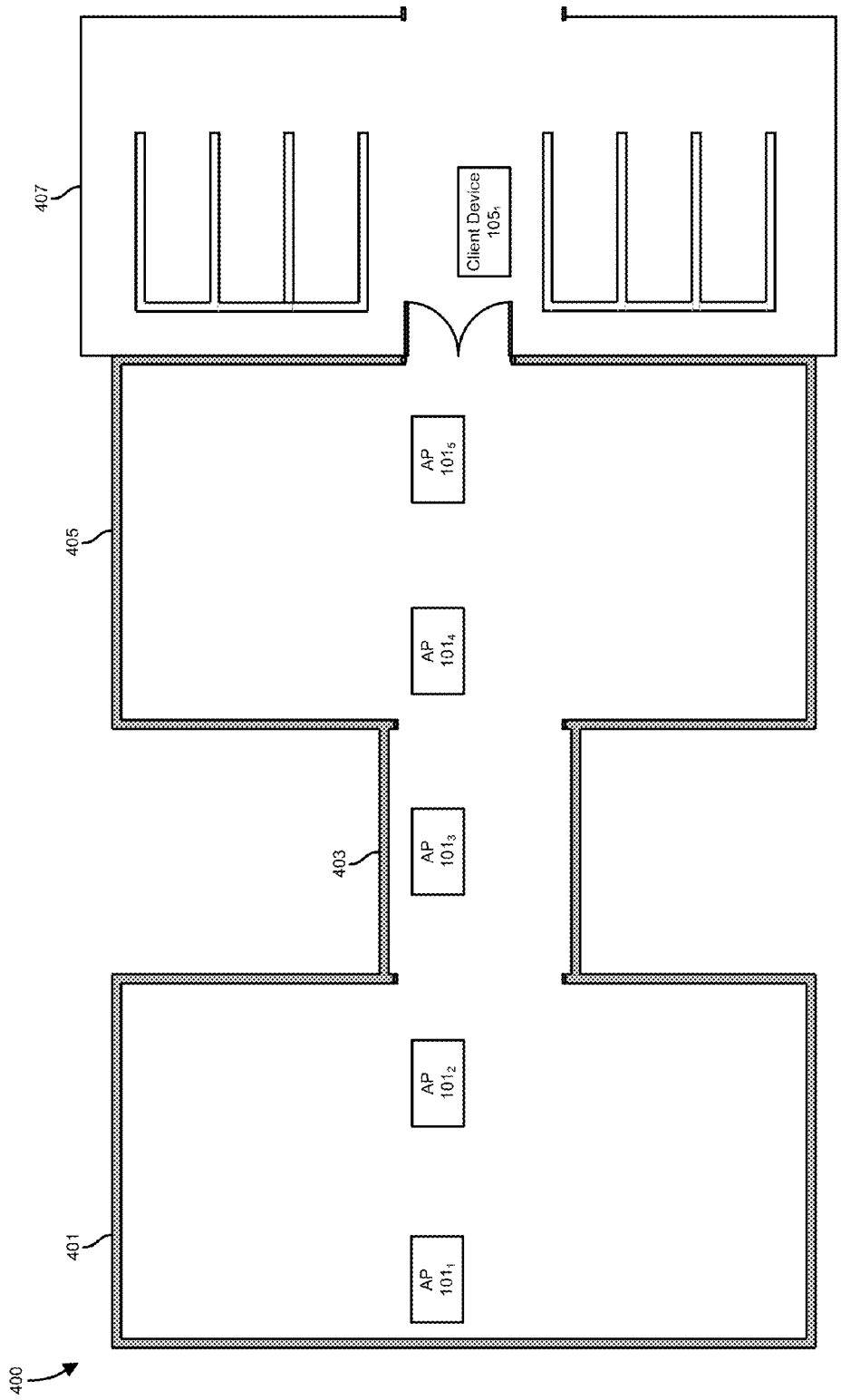
FIG. 6B shows a client device in a parking lot according to one embodiment.

In some embodiments, motion of a client device $105_1$-$105_P$ relative to the access points $101_1$-$101_N$ in the network environment may indicate that movement of the client device $105_1$-$105_P$ is unnecessary or would be of minimal benefit. For example, as shown in FIG. 6A, the client device $105_1$ may be initially at a first location in the building 400 (i.e., located in the lobby 405 of the building 400). In this first location, the client device $105_1$ may be associated with the access point $101_4$ based on initial strong signal strength characteristics between the client device $105_1$ and the access point $101_4$. As shown in FIG. 6B, which is observed at a later point in time relative to the example shown in FIG. 6A, the client device $105_1$ may be at a second location in the parking lot 407. Based on the motion of the client device $105_1$ from the first location to the second location, a stronger signal strength value may be observed between the client device $105_1$ and the access point $101_5$ than between the client device $105_1$ and the access point $101_4$, with which the client device $105_1$ is currently associated. These signal strength readings may be observed by operation 303 when determining the location of the client device $105_1$. Although these stronger signal strength values between the client device $105_1$ and the access point $101_5$ may traditionally indicate that the client device $105_1$ should move from the access point $101_4$ to the access point $101_5$, this movement may be inefficient and unnecessary.

In particular, a motion vector describing the motion of the client device $105_1$ from the first location shown in FIG. 6A to the second location shown in FIG. 6B indicates that the client device $105_1$ is on a trajectory to leave the network environment. In particular, since the client device $105_1$ is currently located in the parking lot 407 as shown in FIG. 6B and on a trajectory moving away from the access points $101_1$-$101_5$ within the building, operation 305 may determine that the client device $105_1$ is likely leaving the building 400. Accordingly, movement of the client device $105_1$ from the access point $101_4$ to the access point $101_5$ will not provide the client device $105_1$ any actual improvement in network access as the client device $105_1$ will likely soon be leaving the network system 100 entirely. In particular, since the client device $105_1$ is in the parking lot 407 and moving away from the edge access point $101_5$, the client device $105_1$ will likely be moving to another network (e.g., a cellular network or another enterprise network system). Thus, any minor improvements in network access for the client device $105_1$ during the short remaining duration in the network system 100 will likely be outweighed by the overhead in moving the client device $105_1$ to the access point $101_5$ and possible interruptions in network service caused by the movement between access point $101_4$ and access point $101_5$.

In other embodiments, when the motion vector indicates that the client device $105_1$ is not traveling away from the building 400, operation 305 may determine that movement between access points $101_4$ and $101_5$ is appropriate. For example, although the client device $105_1$ has moved from the first position shown in FIG. 6A to the second position shown in FIG. 6B, the motion vector determined at operation 303 may indicate that the client device $105_1$ is now stably stationed at this second location in the parking lot 407. This stability or lack of movement out of the network system 100 may be further evidenced by traffic generation by the client device $105_1$ at the second location. Accordingly, in this scenario, since the motion vector and possibly other criteria indicate a stable location and thus that the client device $105_1$ will not likely be soon leaving the network system 100, operation 305 may determine that the client device $105_1$ should move from the access point $101_4$ to the access point $101_5$. This movement to the access point $101_5$ allows the client device $105_1$ to have an improved wireless connection since as noted above the client device $105_1$ shares a higher signal quality with the access point $101_5$ than with the access point $101_4$. Signal quality may be based on signal strength or signal-to-noise ratios (SNR). In these embodiments, the signal quality may be based on an average signal strength/SNR value, a best signal strength/SNR value, a median signal strength/SNR value, etc.

In some embodiments, the decision regarding movement of the client device $105_1$ between the access point $101_4$ and the edge access point $101_5$ may be based on the time of day and/or the time of the week. For example, the system 100 may be aware that many people leave the building 400 and the network system 100 at approximately 5 PM each weekday (i.e., the end of the work day). Accordingly, motion into the parking lot 407 at 5 PM on a Wednesday may further evidence that the client device $105_1$ will be leaving the network system shortly. Accordingly, operation 305 may avoid movement of the client device $105_1$ based on this determination that the client device $105_1$ will likely be leaving the network system 100.

As indicated above, operation 305 may intelligently determine if the client device $105_1$ should move between access point $101_4$ and $101_5$ based on the location of the client device $105_1$ on the edge of the network environment, the presence/absence of movement, the presence/absence of traffic, and/or other criteria. Accordingly, in this example embodiment, operation 305 may avoid unnecessary moves when the benefit to the client device $105_1$ would be limited or negligible.

In some embodiments, this avoidance of movement to the edge access point $105_5$ when the client device $105_1$ is in motion to leave the network system 100 may be for a limited time period. For example, operation 305 may wait for a predefined time period to determine if the client device $105_1$ has left the network system 100. In response to the client device $105_1$ not leaving the system 100 after this predefined time period, operation 305 may determine that the client device $105_1$ should move to the access point $101_5$. Accordingly, a delay may be used to determine the intentions of the client device $105_1$ before triggering a move to the edge access point $101_5$.

Passing Through Client Device $105_1$-$105_P$

Similar to the example provided above, in some embodiments the location and motion of a client device $105_1$-$105_P$ may be used at operation 305 to determine whether a client device $105_1$-$105_P$ should move between access points $101_1$-$101_N$. In this example embodiment, the traffic characteristics of a region within the network environment and/or an access point $101_1$-$101_N$ may be examined to determine whether a client device $105_1$-$105_P$ should be moved from a currently associated access point $101_1$-$101_N$ or whether movement should be delayed/avoided.

Figure 7A:
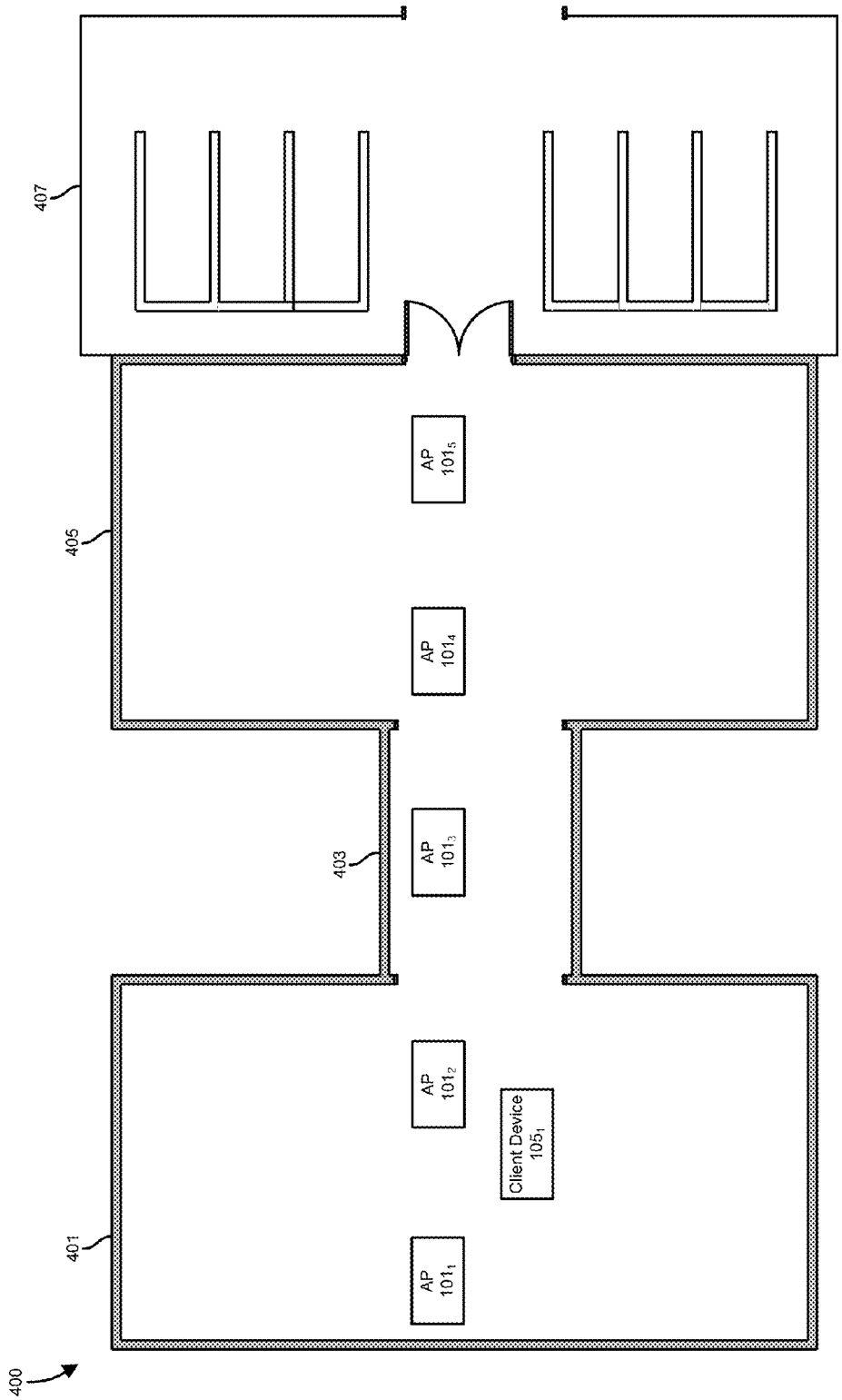
FIG. 7A shows a client device in a main office of a building according to one embodiment.
Figure 7B:
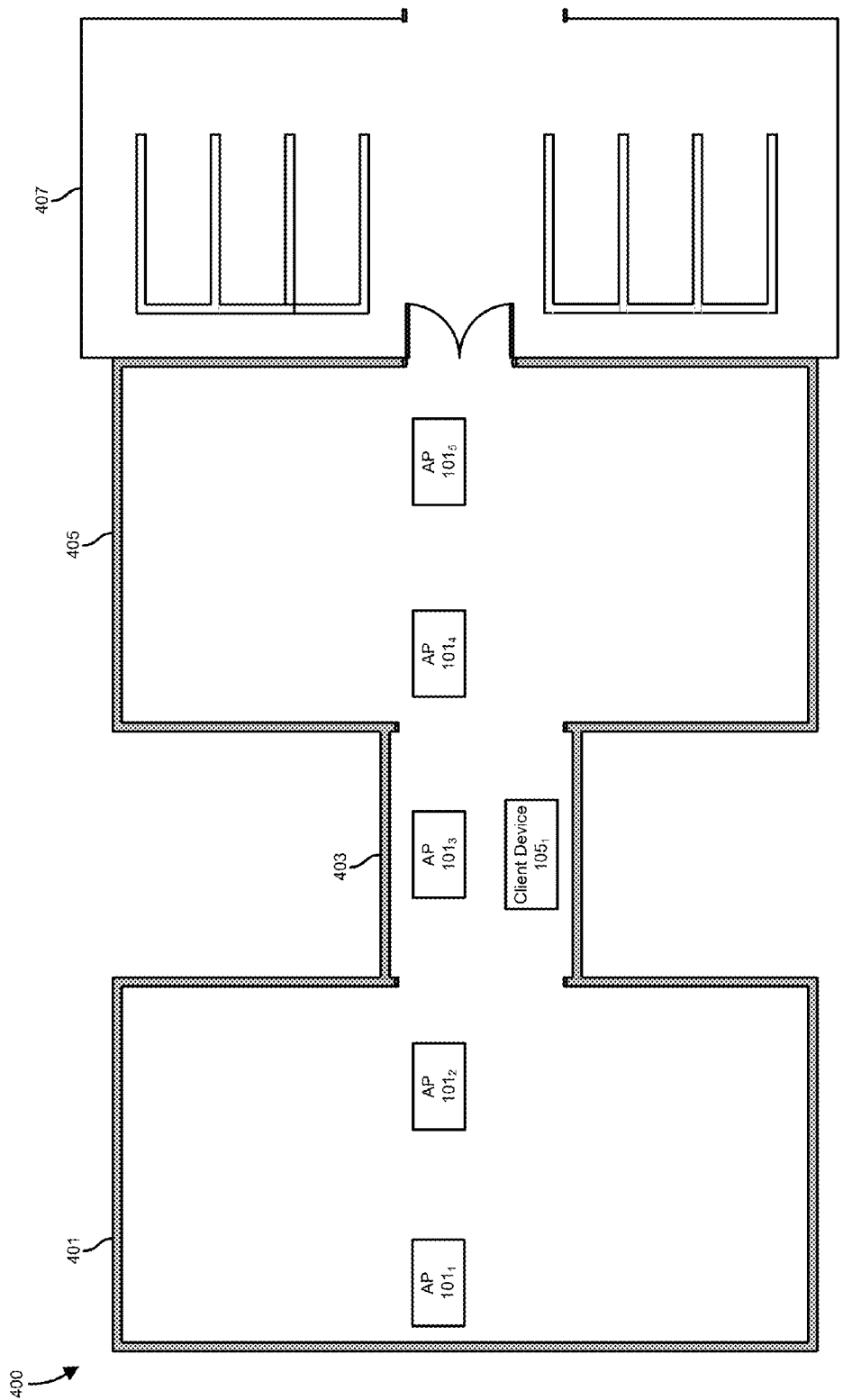
FIG. 7B shows a client device in a hallway of a building according to one embodiment.

For example, as shown in FIG. 7A, the client device $105_1$ may be determined to be located at a first location, which is within the main office 401. In FIG. 7B, the client device $105_1$ may be determined to be located at a second location within the hallway 403. These first and second locations may be determined over a period of time, which results in a corresponding motion vector to be generated at operation 303 that indicates that the client device $105_1$ is moving from the main office 401 in the direction of the lobby 405 via the hallway 403. Since the client device $105_1$ is moving away from the access point $101_2$, which the client device $105_1$ is currently associated with, a corresponding signal strength value corresponding to the client device $105_1$ and the access point $101_2$ may be low in comparison to a signal strength value corresponding to the client device $105_1$ and the access point $101_3$. In traditional systems, this higher signal strength value may cause the client device $105_1$ to immediately move to the access point $101_3$. This movement ostensibly increases wireless connection quality, because the signal strength values between the client device $105_1$ and the access point $101_3$ are better than the signal strength values between the $105_1$ and the access point $101_2$. However, this improvement in connection quality may be limited based on the trajectory of the client device $105_1$.

In particular, the client device $105_1$ may be moving through the hallway 403 to reach the lobby 405. Since the client device $105_1$ will only be in the hallway 403 for a limited period of time (e.g., 5-15 seconds) and upon reaching the lobby 405 will be in range of the access points $101_4$ and $101_5$, the movement from the access point $101_2$ to the access point $101_3$ may be fleeting. Namely, in some embodiments in which the client device $105_1$ does not spend a significant amount of time in the hallway 403, the client device $105_1$ may only be associated with the access point $101_3$ for a short period of time before the client device $105_1$ moves closer to the access point $101_4$ and makes a corresponding move to this access point $101_4$.

To eliminate the limited benefits of a short movement to an access point $101_1$-$101_N$ while a client device $105_1$-$105_P$ in transitioning between points of interest, operation 305 may examine the motion of the client device $105_1$-$105_P$ and characteristics of a potential access point $101_1$-$101_N$ for movement. For example, access points $101_1$-$101_N$ may be categorized based on their location in the network environment. For instance, access points $101_1$-$101_N$ in hallways or other locations that client devices $105_1$-$105_P$ only spend a limited amount of time in before locating to a different area serviced by other access points $101_1$-$101_N$ may be categorized as transitional access points $101_1$-$101_N$. This categorization may be determined/defined at operation 301 while determining the layout of the access points $101_1$-$101_N$ in the network system 100.

In these embodiments, when the signal strength value between a client device $105_1$-$105_P$ and a currently associated access point $101_1$-$101_N$ is decreasing while the signal strength value between the client device $105_1$-$105_P$ and a transitional access point $101_1$-$101_N$ is increasing, operation 305 examines the motion vector of the client device $105_1$-$105_P$ to determine if the client device $105_1$-$105_P$ should move to the transitional access point $101_1$-$101_N$. When the motion vector of the client device $105_1$-$105_P$ indicates that the client device $105_1$-$105_P$ is moving towards another area via the area serviced by the transitional access point $101_1$-$101_N$, operation 305 may delay or temporarily avoid movement of the client device $105_1$-$105_P$. In this embodiment, the movement may be delayed until the signal strength value between the client device $105_1$-$105_P$ and the access point $101_1$-$101_N$ in the new/destination area is above a threshold (e.g., above the signal strength value between the client device $105_1$-$105_P$ and the currently associated access point $101_1$-$101_N$). Accordingly, operation 305 may avoid movement of the client device $105_1$-$105_P$ until the client device $105_1$-$105_P$ is in range of an access point in the new/destination area such that the client device $105_1$-$105_P$ may avoid association with the transitional access point $101_1$-$101_N$.

For example, in FIG. 7B, the client device $105_1$ may be headed through the hallway 403 to the lobby 405. In this embodiment, operation 305 may recognize this motion by examining the motion vector produced at operation 303 and delay movement of the client device $105_1$. In this example, operation 305 may delay movement of the client device $105_1$ until the client device $105_1$ is in range of the access point $101_4$ such that the client device $105_1$ may associate with the access point $101_4$ in this destination location (e.g., the lobby 405). Accordingly, operation 305 may avoid the overhead and interruption in moving the client device $105_1$ to the access point $101_3$ for a small period of time by recognizing that the client device $105_1$ is moving through the hallway 403 en route to the lobby 405. In some embodiments, where the motion vector of the client device $105_1$ indicates that the client device $105_1$ is not moving within the hallway 403, operation 305 may move the client device $105_1$ to the access point $101_3$ without delay. As a result, movement to a transitional access point $101_3$ is allowed to occur when the corresponding client device $105_1$ is in the transitional area (i.e., the hallway 403) for an extended period of time.

Moving vs. Shadowing

In some embodiments, operation 305 may take into account shadowing effects when determining an access point $101_1$-$101_N$ for movement of a client device $105_1$-$105_P$. Shadowing is an effect caused by obstruction of wireless traffic to/from a client device $105_1$-$105_P$. For example, a user may place the client device $105_1$ in his/her pocket. While in the user's pocket, the client device $105_1$ may attempt to communicate with the access point $101_1$. However, wireless signals between the client device $105_1$ and the access point $101_1$ may be partially blocked by the user's body. In this case, the body of the user is in the line of sight between the client device $105_1$ and the access point $101_1$. This blockage may result in reduced signal strength values for wireless signals between the client device $105_1$ and the access point $101_1$. However, this fluctuation in signal strength values may only be in relation to a set of access points $101_1$-$101_N$ that are blocked by the body of the user. Accordingly, the client device $105_1$ may be triggered to associate with one of the access points $101_2$-$101_N$ with stronger associated signal strength values with the client device $105_1$. However, these stronger signal strength values are at least partially erroneous as they are based on potentially momentary blockages/interferences.

To accommodate these shadowing effects, operation 305 may take into account the location of the client device $105_1$ determined at operation 303. Namely, when the location of the client device $105_1$ determined at operation 303 indicates that the client device $105_1$ is not moving, operation 303 may determine that the reduction in signal strength values between the client device $105_1$ and the access point $101_1$ may be the result of shadowing. Based on the detection of shadowing effects, operation 305 may determine that the client device $105_1$ should not be moved to a new access point $101_2$-$101_N$ and/or delay a movement until the effects of shadowing have reduced or been eliminated.

Multiple Strong Access Points $101_1$-$101_N$

Figure 8:
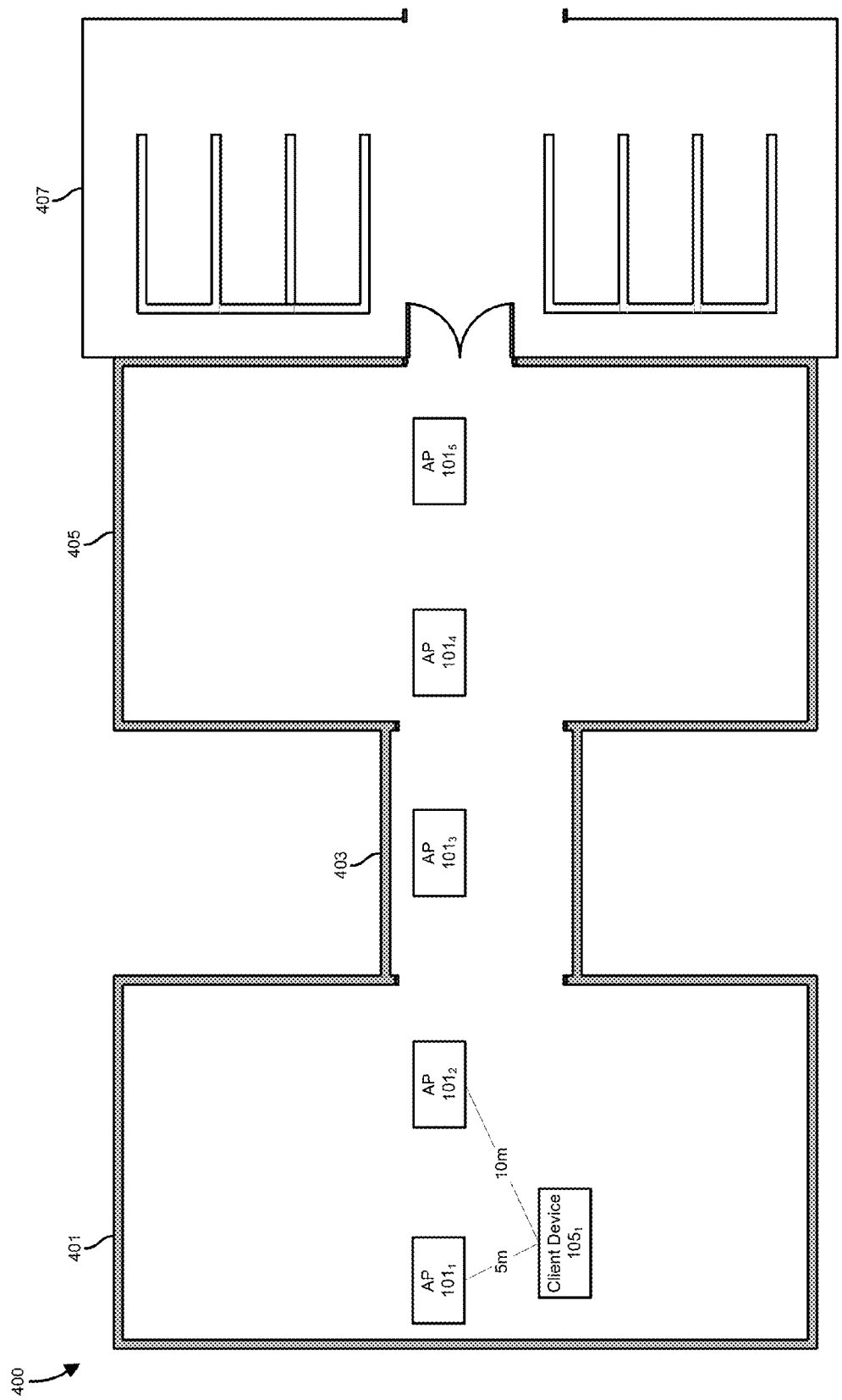
FIG. 8 shows a client device located in between two access points according to one embodiment.

In one embodiment, operation 305 may resolve decisions to move a client device $105_1$-$105_P$ to one of a set of access points with similar or identical signal strength characteristics with the client device $105_1$-$105_P$ based on a determined location of the client device $105_1$. For example, as shown in FIG. 8, the client device $105_1$ may be located between the access point $101_1$ and the access point $101_2$. In particular, the client device $105_1$ may be 5 meters from the access point $101_1$ and 10 meters from the access point $101_2$. In this configuration, signal strength characteristics for wireless signals between the client device $105_1$ and the access point $101_1$ and wireless signals between the client device $105_1$ and the access point $101_2$ may be identical. For instance, the RSSI value for wireless signals between the client device $105_1$ and the access point $101_1$ may be 15 dB while the wireless signals between the client device $105_1$ and the access point $101_2$ may also be 15 dB.

On the basis of the above signal strength values, traditional systems may be equally likely to assign the client device $105_1$ to either of the access points $101_1$ or $101_2$. This tendency is based on the fact that these traditional systems link client devices $105_1$-$105_P$ and access point $101_1$-$101_N$ based solely on the quality of signals between each set of components. When these signals are viewed as equivalent in quality, the decision on association may be a random decision. However, in one embodiment of the method 300, the decision of association may be based on client device $105_1$-$105_P$ proximity to access points $101_1$-$101_N$. For instance, returning to the example above in relation to FIG. 8, since the client device $105_1$ is closer to the access point $101_1$ than the access point $101_2$ (i.e., 5 meters vs. 10 meters), operation 305 may determine that the client device $105_1$ should move to the access point $101_1$. Similarly, this decision may be based on motion of the client device $105_1$. For example, when a motion vector determined at operation 303 indicates that the client device $105_1$ is moving toward the access point $101_1$ and away from the access point $101_2$, operation 305 may indicate that the client device $105_1$ should associate with the access point $101_1$. Conversely, when a motion vector determined at operation 303 indicates that the client device $105_1$ is moving towards the access point $101_2$ and away from the access point $101_1$, operation 305 may indicate that the client device $105_1$ should associate with the access point $101_2$. In some embodiments, movement may be weighted more highly than a distance between the client device $105_1$ and the access points $101_1$ and $101_2$. In particular, as in the example above, even though the client device $105_1$ is currently closer to the access point $101_1$, when the client device $105_1$ is moving closer to the access point $101_2$, operation 305 may determine that this is a more appropriate access point $101_1$-$101_N$ to be associated.

Nighttime Bandwidth King

Figure 9:
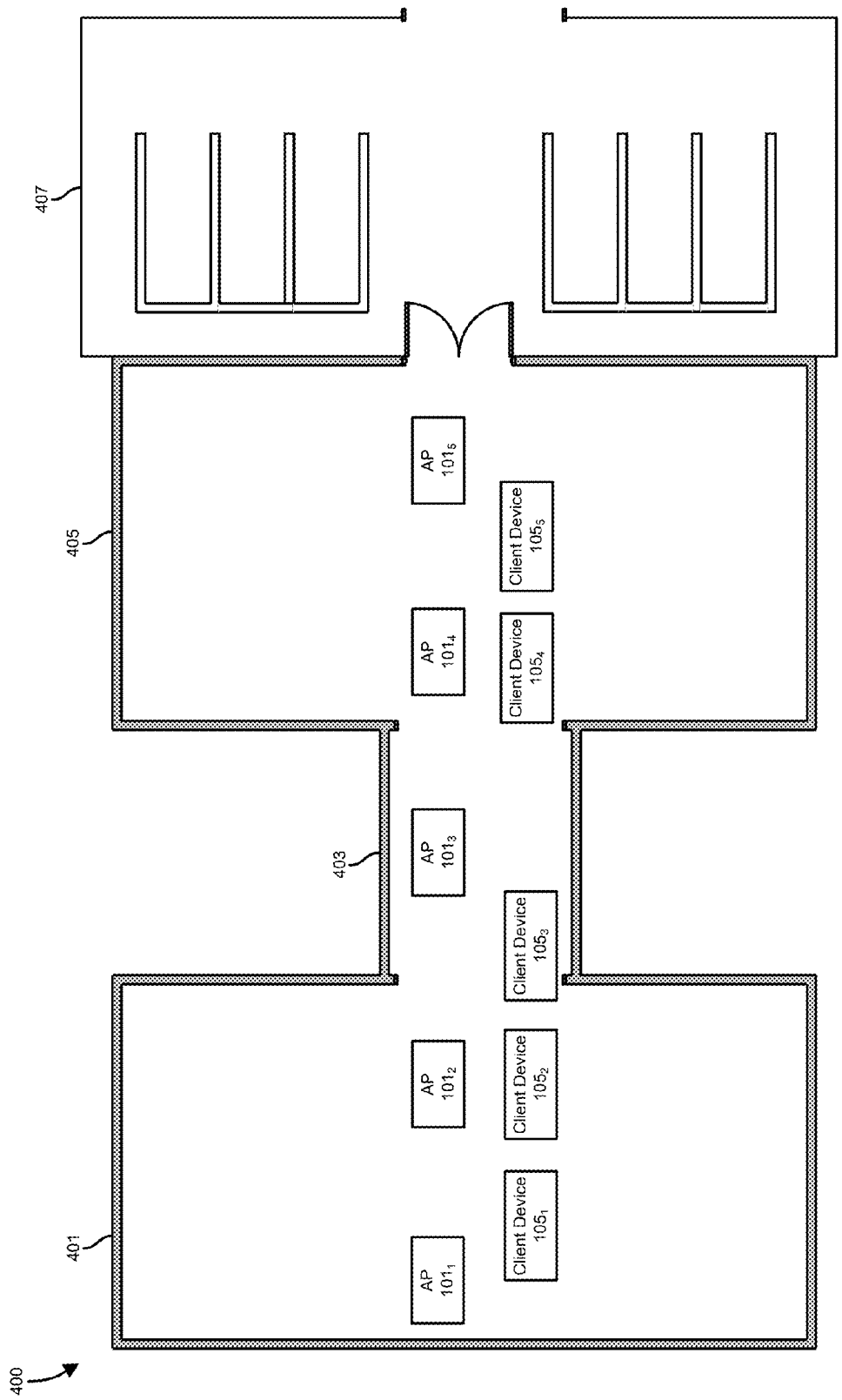
FIG. 9 shows a set of client devices located in a building with a set of access points according to one embodiment.

In some embodiments, client devices $105_1$-$105_P$ may be moved to access points $101_1$-$101_N$ based on their location and their lack of motion. For example, in some embodiments, operation 303 may determine that one or more of the client devices $105_1$-$105_P$ are motionless and located in relatively distributed sections of the network environment. For example, FIG. 9 shows client device $105_1$-$105_5$ situated in proximity to the access points $101_1$-$101_5$ within the building 400. In this embodiment, the client devices $101_1$-$101_3$ may be associated with the access point $101_2$ while the client devices $101_4$ and $101_5$ may be associated with the access point $101_4$. This association may be based on various factors, including signal strength characteristics.

As shown in FIG. 9, there are an equal number of client devices $105_1$-$105_5$ and access points $101_1$-$101_5$. Accordingly, there are an adequate number of access points $101_1$-$101_5$ to assign a separate access point $101_1$-$101_5$ to each client device $105_1$-$105_5$. In one embodiment, operation 305 may assign client devices $105_1$-$105_5$ to separate access points $101_1$-$101_N$ when the client devices $105_1$-$105_5$ are determined to be motionless. By assigning each client device $105_1$-$105_5$ to a separate access point $101_1$-$101_5$, operation 305 may ensure that each client device $105_1$-$105_5$ is not hindered by other client devices $105_1$-$105_5$ operating on the same access point $101_1$-$101_5$.

In one embodiment, the assignment of client devices $105_1$-$105_5$ to access points $101_1$-$101_5$ may be based on the location of each of the client devices $105_1$-$105_5$. For example, the closest client device $105_1$-$105_5$ to each access point $101_1$-$101_5$ may be assigned to that corresponding access point $101_1$-$101_5$. In other embodiments, statistical analysis may be used for assignment of client devices $105_1$-$105_5$ to access points $101_1$-$101_5$. For example, a minimization function may be used to ensure that the total distance or the average distance between client devices $105_1$-$105_5$ and associated access points $101_1$-$101_5$ is minimized.

In some embodiments, assignment of client devices $105_1$-$105_P$ to dedicated access points $101_1$-$101_N$ may be performed based on the time of day and/or the time of week. For example, this movement of client devices $105_1$-$105_P$ to dedicated access points $101_1$-$101_N$ may be limited to the night time (e.g., after 5:00 PM), weekends, and/or holidays. By limiting dedicated access points $101_1$-$101_5$ during these periods, the method 300 ensures a limited possibility of new client devices $105_1$-$105_P$ joining the network system 100, which might not allow a dedication of access points $101_1$-$101_N$.

Although described above in relation to a dedicated access point $101_1$-$101_N$ for each client device $105_1$-$105_P$, in other embodiments, a different amount of client devices $105_1$-$105_P$ may be assigned to access points $101_1$-$101_N$. For example, each access point $101_1$-$101_N$ may be assigned a set of x client devices $105_1$-$105_P$ (where x>1) when the client devices $105_1$-$105_P$ are determined to be motionless.

As described above, the client devices $105_1$-$105_P$ may be assigned to dedicated access points $101_1$-$101_N$ to ensure even distribution of network traffic load when the client devices $105_1$-$105_P$ are motionless. This distribution ensures higher quality wireless connections and corresponding improved network performance.

Following a determination at operation 305 that movement to a new access point $101_1$-$101_N$ should be avoided/delayed, the method 300 may return to operation 303 to examine the location and/or motion of the client devices $105_1$-$105_P$. Conversely, following a determination at operation 305 that movement to a new access point $101_1$-$101_N$ should occur, the corresponding client devices $105_1$-$105_P$ may be marked for movement to a corresponding access point $101_1$-$101_N$ at operation 307. In this embodiment, at operation 309 each of the access points $101_1$-$101_N$, except for the access point $101_1$-$101_N$ selected at operation 305, may be informed to ignore any probe requests from the selected client device $105_1$-$105_P$. Accordingly, when the selected client device $105_1$-$105_P$ transmits a probe request to each of the access points $101_1$-$101_N$, at operation 311 only the access point $101_1$-$101_N$ selected at operation 305 will respond such that the selected client device $105_1$-$105_P$ may associate with this new/optimal access point $101_1$-$101_N$.

As described above, the method 300 triggers movement of client devices $105_1$-$105_P$ to new access points $101_1$-$101_N$ based on the location and/or motion of the client devices $105_1$-$105_P$. In particular, the method 300 may determine the location of a client device $105_1$-$105_P$ and/or whether the client device $105_1$-$105_P$ is stationary or in motion. Based on these determinations, the method 300 may 1) delay a potential move of the client device $105_1$-$105_P$ to a new access point $101_1$-$101_N$ until the client device $105_1$-$105_P$ reaches a non-transitional or less dense area or is stationary, 2) delay a potential move of the client device $105_1$-$105_P$ to a new access point $101_1$-$101_N$ while the client device $105_1$-$105_P$ is on the edge of the network environment, 3) compute a probable destination of the client device $105_1$-$105_P$ and wait until this destination is reached before triggering movement of the client device $105_1$-$105_P$ to a new access point $101_1$-$101_N$, 4) reduce the effects caused by shadowing by levering location and motion information, 5) guide the client device $105_1$-$105_P$ to more proximate access points $101_1$-$101_N$ when one or more other factors are equal, and 6) guide the client device $105_1$-$105_P$ to dedicated proximate access points $101_1$-$101_N$ when client devices $105_1$-$105_P$ are relatively motionless and network usage is low. Accordingly, the method 300 provides processes and techniques for dynamically leveraging client device $105_1$-$105_P$ location and motion to intelligently assign client devices $105_1$-$105_P$ to access points $101_1$-$101_N$.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more processors, cause the one or more processors to:
    determine a layout of a plurality of access points in a network;
    determine a direction of each access point of the plurality of access points relative to each other in the network;
    determine a location of one or more edge access points to determine a periphery of the network;
    determine a first signal quality corresponding to wireless signals received by a first access point from a client device, wherein the client device is associated with the first access point;
    determine that a second signal quality corresponding to wireless signals received by a second access point from the client device;
    determine that the first signal quality is lower than the second signal quality;
    based on a current location, motion vector, and/or a trajectory of the client device, determine whether to cause the client device to switch from (a) associating with the first access point to (b) associating with the second access point; and
    based on the current location, motion vector, and/or a trajectory of the client device, refrain from causing the client device to switch from (a) associating with the first access point to (b) associating with the second access point.

2. The medium of claim 1, wherein the refrain from causing the client device to switch is based on a determination that the client device is moving toward a third access point.

3. The medium of claim 2, wherein the instructions are further to cause the one or more processors to cause the first client device to switch from (a) associating with the first access point to (b) associating with the third access point.

4. The medium of claim 1, wherein the refrain from causing the client device to switch is based on a determination that a signal quality of wireless signals received by a third access point is increasing.

5. The medium of claim 1, wherein the determine whether to cause the client device to switch is based on the current location of the client device.

6. The medium of claim 1, wherein the determine whether to cause the client device to switch is based on the motion vector of the client device.

7. The medium of claim 1, wherein the determine whether to cause the client device to switch is based on the trajectory of the client device.

8. The medium of claim 1, wherein the refrain from causing the client device to switch is based on a determination that the client device is only temporarily at the current location.

9. The medium of claim 1, wherein the refrain from causing the client device to switch is based on a determination that the client device is leaving a wireless network coverage area.

10. The medium of claim 1, wherein the instructions are further to cause the one or more processors to switch the client device from (a) associating with the first access point to (b) associating with the second access point subsequent to a period of time during which the refraining operation was performed.

11. The medium of claim 1, wherein the refrain from causing the client device to switch is based on a determination let that a decrease in the first signal quality occurred without the client device changing locations.

12. A non-transitory computer readable medium comprising instructions which, when executed by one or more processors, cause the one or more processors to:
- determine a layout of a plurality of access points in a network;
- determine a direction of each access point of the plurality of access points relative to each other in the network;
- determine a location of one or more edge access points to determine a periphery of the network;
- detect a first wireless signal quality corresponding to wireless signals received by a first access point from a client device is decreased, wherein the client device is associated with the first access point;
- determine that a second wireless signal quality corresponding to wireless signals received by a second access point from the client device is not changed; and
- responsive at least to a determination that the second wireless signal quality is not changed, refrain from causing the client device to associate with another access point different than the first access point for at least a temporary period of time.

13. The medium of claim 12, wherein the instructions are further to cause the one or more processors to:
- responsive at least to a determination let that the first wireless signal quality has not increased during the temporary period of time, cause the client device to associate with another access point different than the first access point.

14. The medium of claim 12, wherein the instructions are further to cause the one or more processors to:
- responsive at least to a determination let that the first wireless signal quality has increased during the temporary period of time, refrain from causing the client device to associate with another access point.

15. A non-transitory computer readable medium comprising instructions which, when executed by one or more processors, cause the one or more processors to:
- determine a layout of a plurality of access points in a network;
- determine a distance separating the plurality of access points;
- determine a direction of each access point of the plurality of access points relative to each other in the network;
- determine a location of one or more edge access points to determine a periphery of the network;
- determine that a first set of wireless signals received by a first access point from a client device meet a signal quality criteria, wherein the client device is associated with the first access point;
- determine that a second set of wireless signals received by a second access point from the client device meet the signal quality criteria;
- determine that the client device is closer in distance to the second access point than the first access point; and
- responsive to a determination that the client device is closer in distance to the second access point than the first access point, cause the client device to switch association from the first access point to the second access point.

16. The medium of claim 15, wherein a signal quality of wireless signals received by the first access point from the client device is better than the signal quality of wireless signals received by the second access point.

17. The medium of claim 15, wherein the instructions are to cause the one or processors to cause the client device to switch association from the first access point to the second access point based on a determination that the client device is moving closer to the first access point.

* * * * *